(12) United States Patent
Lee et al.

(10) Patent No.: US 7,855,757 B2
(45) Date of Patent: Dec. 21, 2010

(54) LIQUID CRYSTAL DISPLAY, METHOD OF MANUFACTURING THE SAME, AND METHOD OF REPAIRING THE SAME

(75) Inventors: Jong-Hyuk Lee, Seoul (KR); Beom-Jun Kim, Seoul (KR); Sung-Man Kim, Seoul (KR); Bong-Jun Lee, Seoul (KR); Shin-Tack Kang, Yongin-si (KR); Hyeong-Jun Park, Cheonan-si (KR); Yu-Jin Kim, Asan-si (KR); Jong-Hwan Lee, Anyang-si (KR); Myung-Koo Hur, Cheonan-si (KR); Jong-Oh Kim, Cheonan-si (KR); Hong-Woo Lee, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 319 days.

(21) Appl. No.: 11/828,460

(22) Filed: Jul. 26, 2007

(65) Prior Publication Data
US 2008/0024693 A1 Jan. 31, 2008

(30) Foreign Application Priority Data
Jul. 28, 2006 (KR) ................. 10-2006-0071237
Jul. 28, 2006 (KR) ................. 10-2006-0071239

(51) Int. Cl.
*G02F 1/1343* (2006.01)
(52) U.S. Cl. ............................. 349/38; 349/39; 349/55
(58) Field of Classification Search .............. 349/38, 349/55
See application file for complete search history.

(56) References Cited

U.S. PATENT DOCUMENTS

| 5,691,786 A * | 11/1997 | Nakai ........................ 349/39 |
| 2004/0119051 A1 * | 6/2004 | Yun et al. .............. 252/299.63 |
| 2004/0252259 A1 * | 12/2004 | Schadt et al. ............... 349/117 |
| 2006/0187394 A1 * | 8/2006 | Chen et al. .................. 349/130 |
| 2007/0285369 A1 * | 12/2007 | Park et al. ..................... 345/90 |

FOREIGN PATENT DOCUMENTS

| JP | 11305260 | 11/1999 |
| JP | 2000250436 | 9/2000 |
| KR | 1020050100775 | 10/2005 |

* cited by examiner

*Primary Examiner*—Uyen-Chau N Le
*Assistant Examiner*—Kajli Prince
(74) *Attorney, Agent, or Firm*—Cantor Colburn LLP

(57) ABSTRACT

The present invention provides a liquid crystal display ("LCD"), a method of manufacturing the same, and a method of repairing the same capable of obtaining a wide viewing angle and improving a success ratio of repair. The LCD includes a gate line, a first data line intersecting the gate line, a thin film transistor ("TFT") connected with the gate line and the first data line, a pixel electrode connected with the TFT, a first conductive pattern partially overlapping with a first end of the pixel electrode, a second conductive pattern partially overlapping with a second end of the pixel electrode, and a storage capacitor, wherein at least one of the first conductive pattern and the second conductive pattern partially overlaps with the first data line adjacent to the first end of the pixel electrode and a second data line adjacent to the second end of the pixel electrode, respectively.

13 Claims, 11 Drawing Sheets

LIQUID CRYSTAL DISPLAY, METHOD OF MANUFACTURING THE SAME, AND METHOD OF REPAIRING THE SAME

This application claims priority to Korean Patent Application No. 2006-71237, filed on Jul. 28, 2006 and Korean Patent Application No. 2006-71239, filed on Jul. 28, 2006 and all the benefits accruing therefrom under 35 U.S.C. §119, and the contents of which in its entirety are herein incorporated by reference.

BACKGROUND OF THE INVENTION

1. Field of the Invention

The present invention relates to a liquid crystal display ("LCD"), a method of manufacturing the LCD, and a method of repairing the LCD. More particularly, the present invention relates to an LCD, a method of manufacturing the LCD, and a method of repairing the LCD capable of obtaining a wide viewing angle and improving a success ratio of repair.

2. Description of the Related Art

Liquid crystal displays ("LCDs") display an image by adjusting light transmittance of liquid crystal with dielectric anisotropy using an electric field. The LCD includes gate lines and data lines which intersect each other, and pixels independently driven by each of thin film transistors ("TFTs") within each area defined by the structure intersected. Each of the pixels is charged by a voltage difference between a data signal supplied to a pixel electrode through a TFT and a common voltage supplied to a common electrode of a color filter substrate, liquid crystal molecules are driven by the voltage charged, and light transmittance is controlled, thereby implementing a gray scale according to the data signal.

When failure of the pixel is detected in a test process of the LCD, the data line and the TFT are separated, and then a gate line of a previous stage used as an electrode of a capacitor in a previous-stage storage capacitor method and the pixel electrode are electrically connected by laser welding. Then a gate-off voltage is applied to the pixel electrode through the gate line of the previous stage, and the defective pixel is repaired by darkening the corresponding pixel to be darkly displayed.

However, an LCD which includes at least one of a polarizer into which a discotic liquid crystal layer is inserted for improving a viewing angle and a liquid crystal layer having a high dielectric constant injected between the TFT substrate and the color filter substrate may not implement a repair process described above.

Although a defective pixel is repaired by the method described above, the LCD including a polarizer into which a discotic liquid crystal layer is inserted has a problem that light passing through the polarizer is overly varied by retardation of the discotic liquid crystal layer, thus generating light leakage. Accordingly, there is a problem that the defective pixel repaired may be recognized by a user.

Further, in the LCD including a liquid crystal layer having a high dielectric constant, a voltage higher than a gate-off voltage by about 5V or more should be applied in order to display the defective pixel as a black color.

BRIEF SUMMARY OF THE INVENTION

The present invention provides a liquid crystal display ("LCD"), a method of manufacturing the LCD, and a method of repairing the LCD capable of obtaining a wide viewing angle and improving a success ratio of repair.

In exemplary embodiments of the present invention, the LCD includes a gate line formed on a substrate, a first data line intersecting the gate line with a gate insulating layer interposed there between, a thin film transistor ("TFT") connected with the gate line and the first data line, a pixel electrode connected with the TFT, a first conductive pattern partially overlapping with a first end of the pixel electrode, a second conductive pattern partially overlapping with the second end of the pixel electrode, and a storage capacitor, wherein at least one of the first conductive pattern and the second conductive pattern partially overlaps with the first data line adjacent to the first end of the pixel electrode and a second data line adjacent to the second end of the pixel electrode, respectively.

The first conductive pattern and the second conductive pattern may be formed of a same metal and within a same layer of the LCD as the gate line.

The pixel electrode may receive a pixel signal from the first data line adjacent to the first end of the pixel electrode.

The first conductive pattern may be connected with a first storage electrode connected with the gate line, and the second conductive pattern may include a line portion overlapped with the second end of the pixel electrode and a protrusion portion overlapped with the second data line adjacent to the second end of the pixel electrode to form a floating state. Alternatively, the first conductive pattern may include a line portion overlapped with the first end of the pixel electrode and a protrusion portion overlapped with the first data line adjacent to the first end of the pixel electrode to form a floating state, and the second conductive pattern may be connected with the first storage electrode connected with the gate line.

The storage capacitor may be formed by overlapping the first storage electrode connected with the gate line and a second storage electrode with the gate insulating layer interposed between the first and second storage electrodes.

In a repair process, at least one of the first conductive pattern and the second conductive pattern are electrically connected to the pixel electrode by a laser beam irradiated onto a portion of the pixel electrode overlapped with the at least one of the first conductive pattern and the second conductive pattern. The at least one of the first conductive pattern and the second conductive pattern has a line width greater than a diameter of the laser beam.

The LCD may further include a polarizer for a wide viewing angle positioned over a back surface of the substrate. The LCD may also further include a liquid crystal layer of a high dielectric constant driven by an electric field formed between the pixel electrode and a common electrode facing the pixel electrode.

In other exemplary embodiments of the present invention, a method of manufacturing an LCD includes forming on a substrate a gate metal pattern including a gate electrode, a gate line, a first storage electrode connected with the gate line, a first conductive pattern, and a second conductive pattern, forming a gate insulating layer over the substrate on which the gate metal pattern is formed, forming a semiconductor pattern including an active layer and an ohmic contact layer on the gate insulating layer, forming a source/drain metal pattern including a source electrode, a drain electrode, and first and second data lines over the substrate on which the semiconductor pattern is formed, forming a protective layer having a contact hole exposing the drain electrode over the substrate on which the source/drain metal pattern is formed, and forming on the protective layer a pixel electrode connected with the drain electrode, the pixel electrode having a first end partially overlapping the first conductive pattern and a second end partially overlapping the second conductive pattern, wherein one of the first conductive pattern and the second conductive pattern partially overlaps the first data line adjacent to the first end of the pixel electrode and the second data line adjacent to the second end of the pixel electrode, respectively.

In the method of manufacturing the LCD, one of the first conductive pattern and the second conductive pattern is connected with the first storage electrode.

The method of manufacturing the LCD may further include, during forming the source/drain metal pattern, forming a second storage electrode which forms a storage capacitor by overlapping the first storage electrode with the gate insulating layer interposed there between, wherein the second storage electrode is connected with the pixel electrode.

In still other exemplary embodiments of the present invention, a method of repairing an LCD includes preparing the LCD including a TFT formed on a substrate, a pixel electrode connected with the TFT and formed in a pixel area, a first conductive pattern partially overlapping with a first end of the pixel electrode, a second conductive pattern partially overlapping with a second end of the pixel electrode, a gate line connected with the TFT, and a first data line intersecting the gate line, and at least one of the first data line and a second data line partially overlapping the first conductive pattern and the second conductive pattern, respectively, testing whether or not there is a defective pixel in the LCD, short-circuiting a portion of the pixel electrode of the defective pixel detected in the test process and at least one of the first conductive pattern and the second conductive pattern in an overlapped section of the pixel electrode of the defective pixel and the at least one of the first conductive pattern and the second conductive pattern, and separating the pixel electrode of the defective pixel from the TFT.

In preparing the LCD, the first conductive pattern may include a line portion overlapped with the first end of the pixel electrode and a protrusion portion overlapped with the first data line adjacent to the first end of the pixel electrode to form a floating state, and the second conductive pattern includes a line portion overlapped with the second end of the pixel electrode and a protrusion portion overlapped with the second data line adjacent to the second end of the pixel electrode to form a floating state.

Alternatively, in preparing the LCD, the first conductive pattern may be connected with a first storage electrode connected with the gate line, and the second conductive pattern may include a line portion overlapped with the second end of the pixel electrode and a protrusion portion overlapped with the second data line adjacent to the second end of the pixel electrode to form a floating state.

In yet another alternative embodiment, in preparing the LCD, the first, conductive pattern includes a line portion overlapped with a first end of the pixel electrode and a protrusion portion overlapped with the first data line adjacent to the first end of the pixel electrode to form a floating state, and the second conductive pattern may be connected with the first storage electrode connected with the gate line.

Short-circuiting the portion of the pixel electrode and the at least one of the first conductive pattern and the second conductive pattern in the overlapped section electrically connects at least one of the first conductive pattern and the second conductive pattern with the pixel electrode by a laser beam irradiated onto the portion of the at least one of the first conductive pattern and the second conductive pattern and the pixel electrode in the overlapped section.

BRIEF DESCRIPTION OF THE DRAWINGS

The above and other features and advantages of the present invention will become more apparent by describing exemplary embodiments thereof with reference to the accompanying drawings, in which.

DETAILED DESCRIPTION OF THE INVENTION

Figure 1:
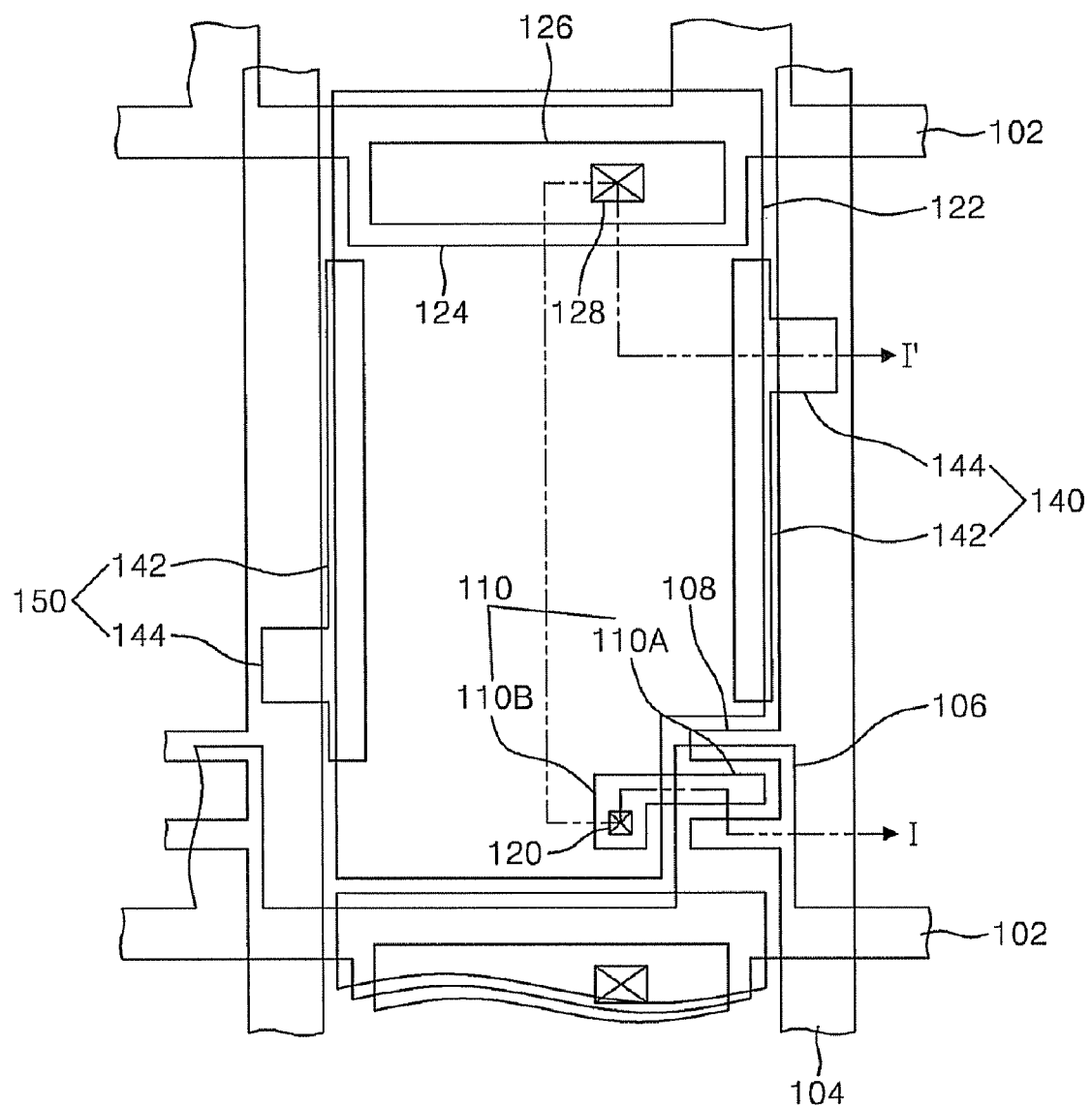
FIG. 1 is a plan view showing an exemplary thin film transistor ("TFT") substrate of an exemplary LCD in accordance with a first exemplary embodiment of the present invention.

The invention now will be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. The device may be otherwise oriented (rotated 90 degrees or at other orientations) and the spatially relative descriptors used herein interpreted accordingly.

Hereinafter, exemplary embodiments of the present invention will now be described in detail with reference to FIGS. 1 to 11.

Figure 2:
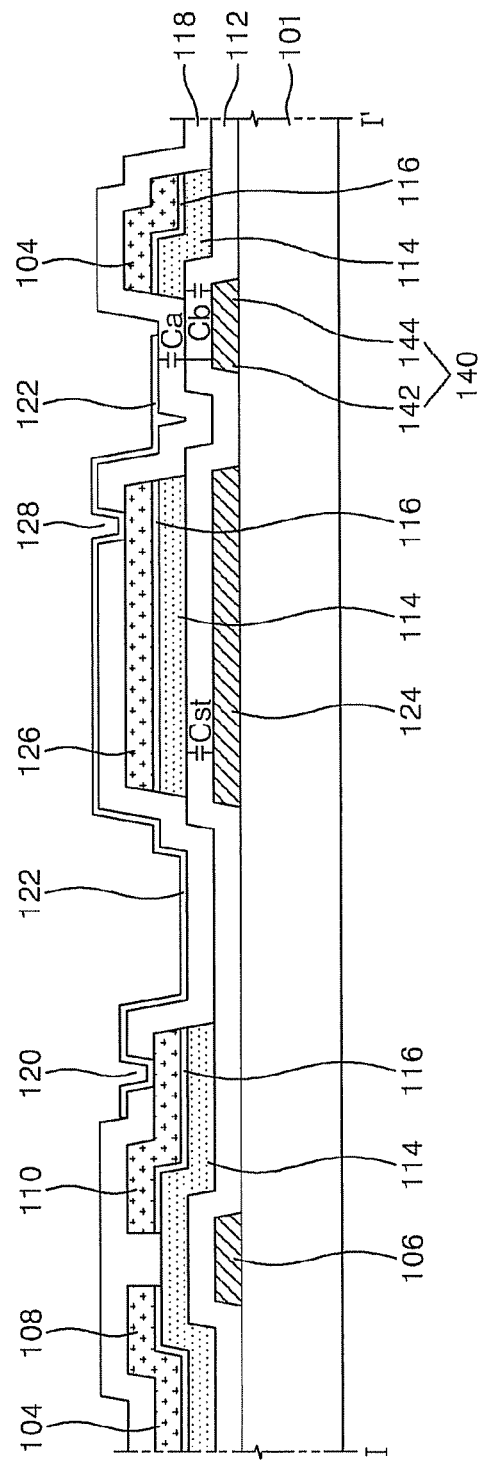
FIG. 2 is a cross-sectional view taken along line I-I' of the exemplary TFT substrate shown in FIG. 1.
Figure 11:
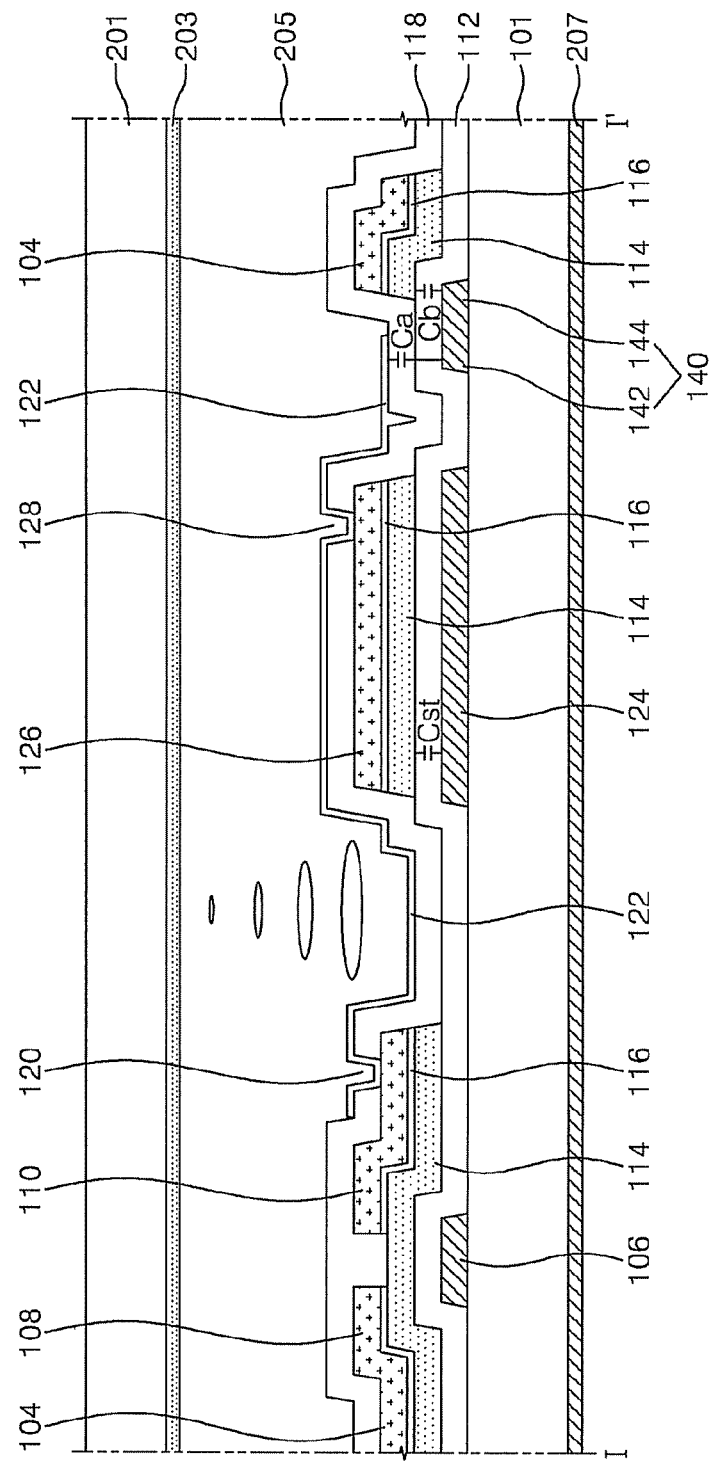
FIG. 11 is a cross-sectional view of the exemplary LCD with the TFT substrate shown in FIGS. 1 and 2.

FIG. 1 is a plan view showing an exemplary thin film transistor ("TFT") substrate of an exemplary LCD in accordance with a first exemplary embodiment of the present invention. FIG. 2 is a cross-sectional view taken along line I-I' of the TFT substrate shown in FIG. 1 and FIG. 11 is a cross-sectional view of an LCD with the TFT substrate shown in FIGS. 1 and 2.

The TFT substrate shown in FIGS. 1 and 2 includes a gate line 102 and a data line 104 formed on a lower substrate 101 to intersect each other with a gate insulating layer 112 interposed there between, a TFT adjacent to intersecting portions of the gate line 102 and the data line 104, a pixel electrode 122 formed in a pixel area, a storage capacitor Cst for preventing variation of a pixel voltage charged in the pixel electrode 122, and first and second conductive patterns 140 and 150 overlapping the pixel electrode 122 and the data line 104.

The gate line 102 supplies a scan signal to a gate electrode 106, which may protrude from the gate line 102, of the TFT. The data line 104 intersects the gate line 102 and supplies a pixel signal to a source electrode 108, which may protrude from the data line 104, of the TFT. In an exemplary embodiment, the pixel area may be defined by the gate line 102 and the data line 104.

The TFT, which is supplied to the data line 104 responsive to a scan signal supplied to the gate line 102, charges and stores the pixel signal in the pixel electrode 122. For doing so, the TFT includes the gate electrode 106 connected with the gate line 102, the source electrode 108 connected with the data line 104, a drain electrode 110 facing the source electrode 108 and connected with the pixel electrode 122, an active layer 114 overlapping the gate electrode 106 with the gate insulating layer 112 interposed there between to form a channel between the source electrode 108 and the drain electrode 110, and an ohmic contact layer 116 formed on the active layer 114 except for the channel so as to make ohmic-contact with the source electrode 108 and the drain electrode 110.

Herein, a semiconductor pattern including the active layer 114 and the ohmic contact layer 116 is formed to overlap with the data line 104 and a second storage electrode 126 in a manufacturing process. The drain electrode 110 includes a neck portion 110A facing the source electrode 108, and a head portion 110B that is connected with the pixel electrode 122 and extends from the neck portion 110A. The source electrode 108 may have a "U" shape that partially surrounds the neck portion 110A.

As shown in FIG. 11, the pixel electrode 122 is connected with the drain electrode 110 exposed through a first contact hole 120 penetrating a protective layer 118. In particular, the first contact hole 120 exposes the head portion 110B of the drain electrode 110. The pixel electrode 122 charges a pixel signal supplied from the TFT and generates a voltage difference with a common electrode 203 formed on a color filter substrate 201. A liquid crystal of a liquid crystal layer 205, which has dielectric anisotropy and interposes between the TFT substrate and the color filter substrate 201 is rotated by the voltage difference and adjusts the amount of light incident through the pixel electrode 122 from a light source (not shown) to transmit toward the color filter substrate 201. Meanwhile, the liquid crystal with a high relative dielectric constant which has a fast response time even at a relatively low voltage is used. The relative dielectric constant of the liquid crystal may be about 14. Further, a polarizer 207, which is located over the back surface of the lower substrate 101 and polarizes light emitted from the light source, uses a polarizer into which a discotic liquid crystal layer is inserted in order to obtain a wide viewing angle.

The storage capacitor Cst stably maintains the pixel signal charged in the pixel electrode 122 until a next pixel signal is charged. The storage capacitor Cst is formed by overlapping a first storage electrode 124 connected with the gate line 102 of a previous stage and a second storage electrode 126 connected with the pixel electrode 122 with the gate insulating layer 112 interposed there between. The first storage electrode 124 is formed of the same metal as the gate line 102 on the lower substrate 101, and may protrude from the gate line 102 in a direction opposite from the protruding direction of the gate electrodes 106. The second storage electrode 126 is formed of the same metal as the data line 104 within a same layer of the TFT substrate as the data line 104, and connected with the pixel electrode 122 through a second contact hole 128 penetrating the protective layer 118.

First and second conductive patterns 140 and 150 are formed in a floating structure and within a same layer of the TFT substrate as the gate line 102. The first conductive pattern 140 is overlapped by a right portion of the pixel electrode 122 and the data line 104 of a current stage adjacent to the right portion of the pixel electrode 122. The second conductive pattern 150 is overlapped by a left portion of the pixel electrode 122 and the data line 104 of a previous or next stage adjacent to the left portion of the pixel electrode 122. Each of the first and second conductive patterns 140 and 150 includes a line portion 142 overlapped by the pixel electrode 122 and a protrusion portion 144 protruding from the line portion 142 to be overlapped by the respective data line 104.

The line portion 142 is formed of the same metal as the gate line 102 on the lower substrate 101 by the same mask process as the process for forming the gate line 102. The line portion 142 is overlapped by each of the right and left portions of the pixel electrode 122 with the gate insulating layer 112 and the protective layer 118 interposed there between to form a first parasitic capacitor Ca between each of the first and second conductive patterns 140, 150 and the pixel electrode 122. In a repair process, a laser beam is irradiated onto a portion overlapping the line portion 142 and the pixel electrode 122 of a defective pixel detected in a test process. For doing so, the line portion 142 is formed to have a line width greater than the diameter of the laser beam and connected with the pixel electrode 122 of a defective pixel in the repair process.

The protrusion portion 144 is formed of the same metal as the line portion 142 and within a same layer of the TFT substrate as the line portion 142 by the same mask process as the process of the data line 142. The protrusion portion 144 of the first conductive pattern 140 is overlapped by the data line 104 of a current stage adjacent to a right portion of the pixel electrode 122 with the gate insulating layer 112 and the protective layer 118 interposed there between to form a second parasitic capacitor Cb. The protrusion portion 144 of the second conductive pattern 150 is overlapped by the data line 104 of a previous or next stage adjacent to a left portion of the pixel electrode 122 with the gate insulating layer 112 and the protective layer 118 interposed there between to form another second parasitic capacitor Cb.

Meanwhile, the exemplary LCD shown in FIGS. 1 and 2 is formed by an exemplary manufacturing method as follows. Herein, the exemplary method of manufacturing the exemplary LCD will now be described in detail with reference to FIG. 2.

First, a gate metal pattern, including the gate line 102, the gate electrode 106, the first storage electrode 124, and the first and second conductive patterns 140 and 150, is formed on the lower substrate 101. The gate metal pattern is formed by patterning a gate metal layer by a photolithography process and an etching process after forming the gate metal layer on the lower substrate 101 by a deposition method such as a sputtering method, etc.

The gate insulating layer 112, a semiconductor pattern including the active layer 114 and the ohmic contact layer 116, and a source/drain metal pattern including the data line 104, the second storage electrode 126, the source electrode 108, and the drain electrode 110 are deposited over the lower substrate 101 on which the gate metal pattern is formed. The gate insulating layer 112 is formed by depositing an inorganic insulating material such as SiOx, SiNx, etc. by a deposition method such as plasma enhanced chemical vapor deposition ("PECVD"), etc. on the entire surface of the lower substrate 101 on which the gate metal pattern is formed. The semiconductor pattern and the source/drain metal pattern are formed by patterning an amorphous silicon ("a-Si") layer, an n+ a-Si layer, and a source/drain metal layer by a photolithography process using a slit mask and an etching process after forming the a-Si layer, the n+ a-Si layer, and the source/drain metal layer. In this way, the semiconductor pattern and the source/drain metal pattern are simultaneously formed. Alternatively, the semiconductor pattern is formed, and then the source/drain metal pattern may be formed over the substrate on which the semiconductor pattern is formed. In other words, the semiconductor pattern is formed by a photolithography process using a mask and an etching process, and then the source/drain metal pattern is formed by a photolithography process using a mask and an etching process.

The protective layer 118 is formed on the gate insulating layer 112 on which the source/drain metal pattern is formed, and then first and second contact holes 120 and 128 are formed. The protective layer 118 is formed by depositing an inorganic insulating material such as SiOx, SiNx, etc. or an organic insulating material such as an acryl resin, etc. on the gate insulating layer 112 on which the source/drain metal pattern is formed. The first and second contact holes 120 and 128 are formed by patterning the protective layer 118 by a photolithography process and an etching process.

The pixel electrode 122 is deposited over the lower substrate 101 on which the protective layer 118 and the first and second contact holes 120 and 128 are formed. The pixel electrode 122 is formed by patterning a transparent conductive layer by a photolithography process and an etching process after forming the transparent conductive layer such as indium tin oxide ("ITO"), tin oxide ("TO"), indium zinc oxide ("IZO"), indium tin zinc oxide ("ITZO"), etc. on the protective layer 118 by a deposition method such as a sputtering method, etc. The pixels, which are included in the LCD prepared by the manufacturing method described above, are tested and defective pixels are identified.

Figure 3:
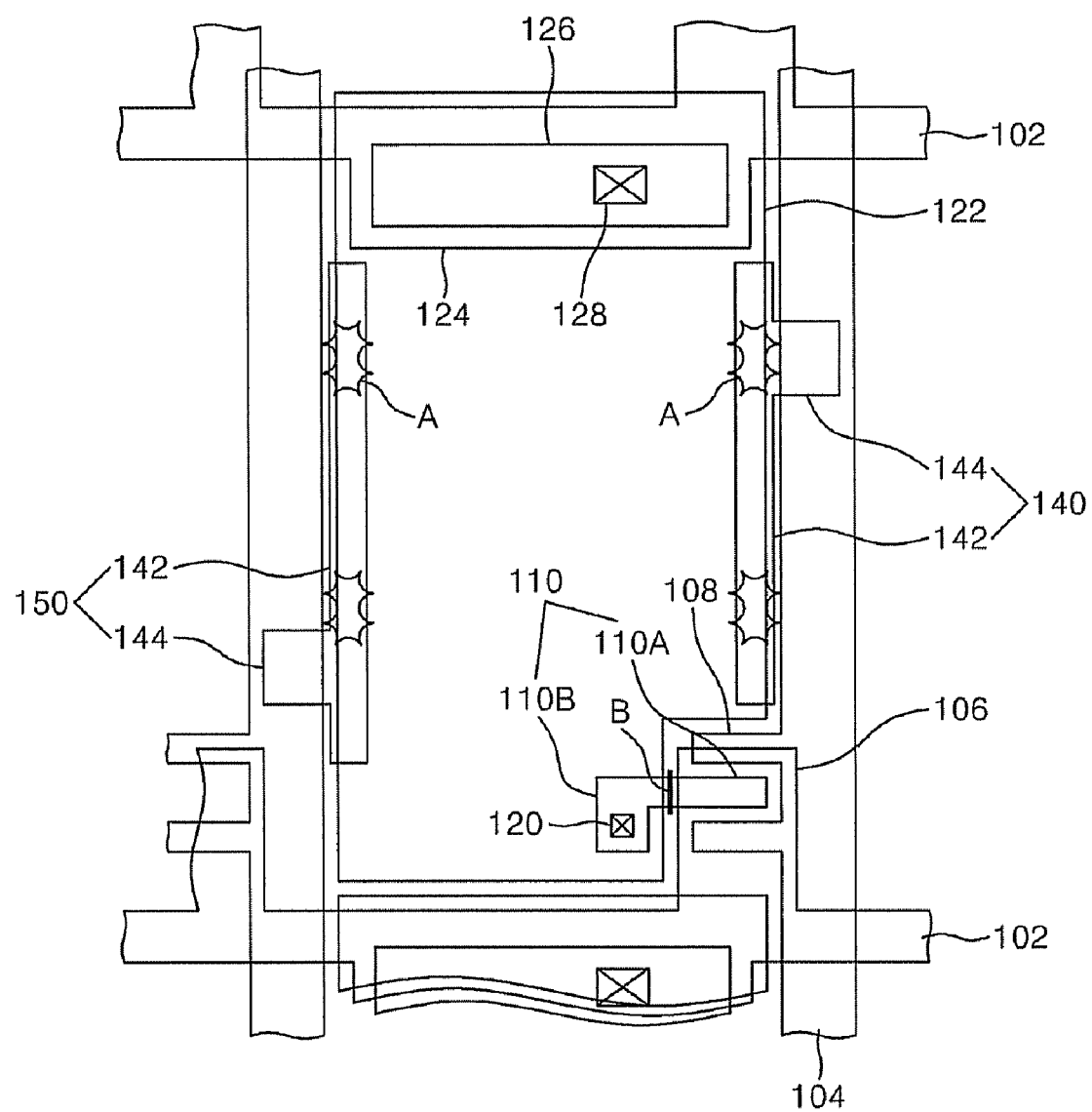
FIG. 3 is a plan view illustrating an exemplary method of repairing the exemplary LCD shown in FIG. 1.
Figure 4A:
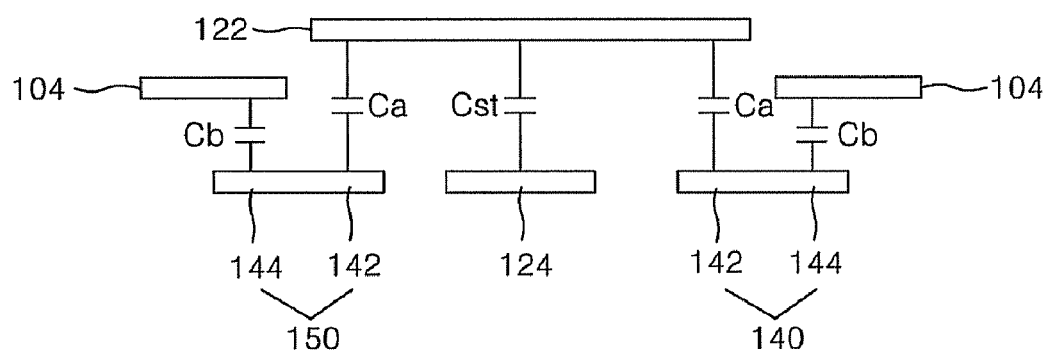
FIGS. 4A and 4B are graphical views comparing before and after repairing the exemplary TFT substrate of the exemplary LCD in accordance with the first exemplary embodiment of the present invention.
Figure 4B:
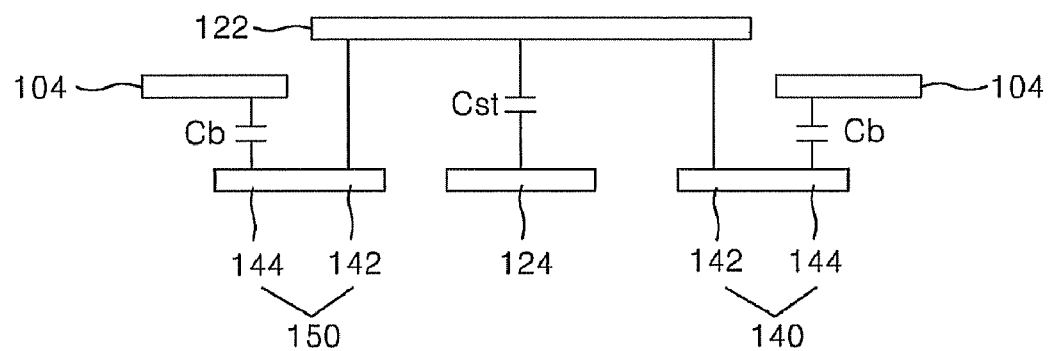

When the defective pixel is detected in a test process, a laser beam is irradiated onto, for example, portions "A" located at overlapping sections of the pixel electrode 122 of the defective pixel and the line portion 142 of each of the first and second conductive patterns 140 and 150 as shown in FIG. 3, and thus the pixel electrode 122 of the defective pixel and the line portions 142 are welded. Accordingly, the first parasitic capacitors Ca formed by the pixel electrode 122 of the defective pixel and the line portions 142 shown in FIG. 4A become short-circuits as shown in FIG. 4B. Then, the neck portion 110A and the head portion 110B of the drain electrode 110 of the TFT are separated by a cutting process at cutting line B, and thus the TFT and the pixel electrode 122 are separated. Accordingly, the gate-off voltage Voff which is floated to the pixel electrode 122 by the storage capacitor Cst is discharged through the data line 104 of a previous or next stage and the data line 104 of a current stage connected through the second parasitic capacitor Cb with the protrusion portion 144 of each of the first and second conductive patterns 140 and 150, as shown in FIG. 4B. As a result, the gate-off voltage Voff applied to the liquid crystal is continuously dropped, and thus the corresponding pixel becomes a dark spot to display a black color.

Figure 5:
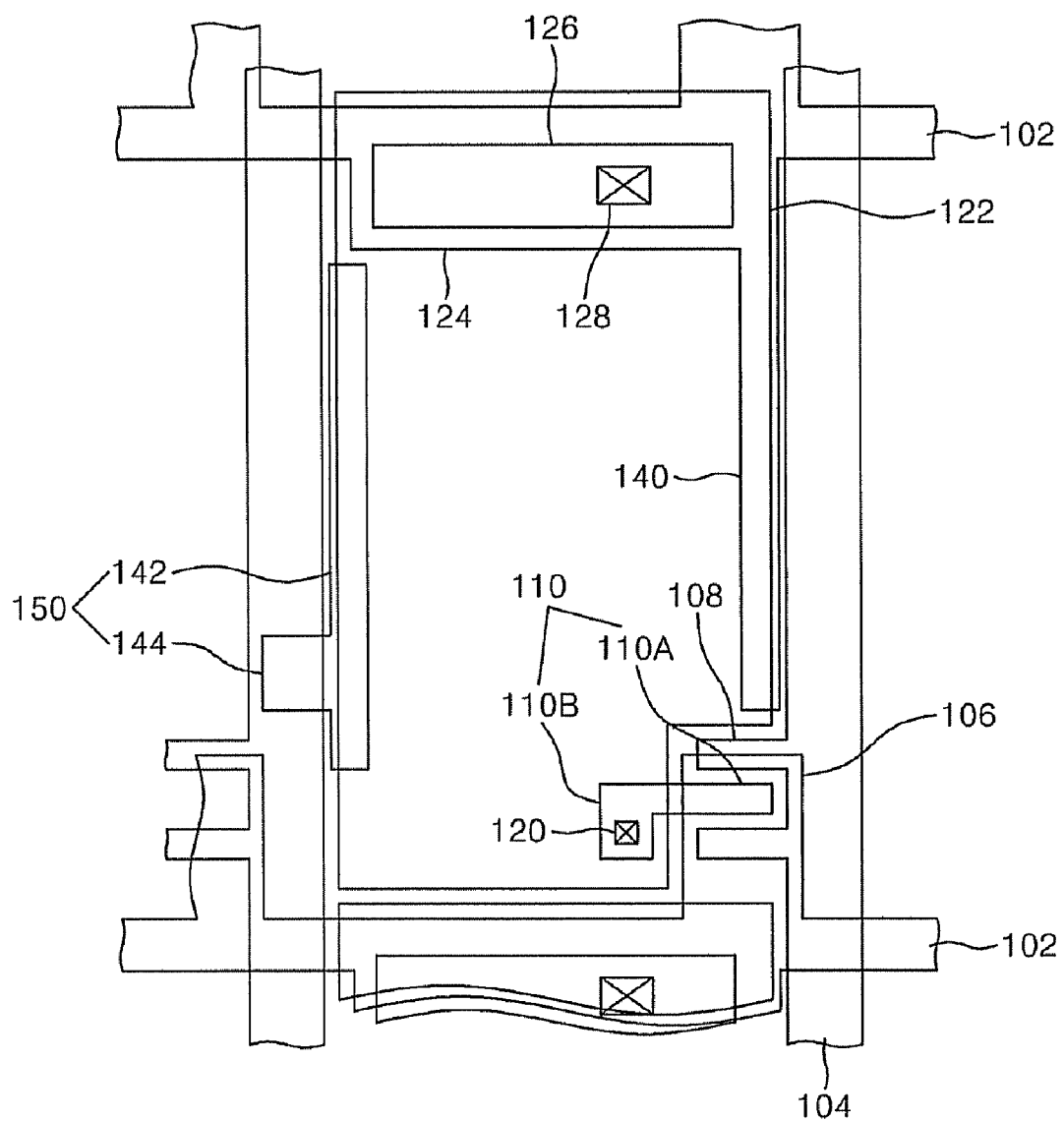
FIG. 5 is a plan view showing the exemplary TFT substrate of the exemplary LCD in accordance with a second exemplary embodiment of the present invention.

FIG. 5 is a plan view showing the exemplary TFT substrate in accordance with a second exemplary embodiment of the present invention.

The TFT substrate shown in FIG. 5 darkens the defective pixel through the second conductive pattern 150, which overlaps the data line of a previous or next stage compared to the exemplary TFT shown in FIGS. 1 and 2. The TFT shown in FIG. 5 includes substantially the same configurations as that of FIGS. 1 and 2 except that the first conductive pattern 140 is connected with the first storage electrode 124. Accordingly, the detailed description of same or similar elements will be omitted.

The storage capacitor Cst stably maintains a pixel voltage signal charged in the pixel electrode 122 until a next pixel signal is charged. The storage capacitor Cst is formed by overlapping the first storage electrode 124 connected with the gate line 102 of a previous stage and the second storage electrode 126, which is connected with the pixel electrode 122, with the gate insulating layer 112 interposed between the first and second storage electrodes 124 and 126.

The second storage electrode 126 is formed of the same metal as the data line 104 and within a same layer of the TFT substrate as the data line 104, and connected with the pixel electrode 122 through the second contact hole 128, which penetrates the protective layer 118.

The first storage electrode 124 connects with the first conductive pattern 140 that vertically extends from the first storage electrode 124. The first conductive pattern 140 is overlapped by a right portion of the pixel electrode 122, and is formed of the same metal as the gate line 102 and the first storage electrode 124 on the lower substrate 101. The area of the first storage electrode 124 connected with the first conductive pattern 140 becomes relatively wider than that of the first storage electrode 124 shown in FIGS. 1 and 2 by the first conductive pattern 140. Accordingly, the capacitance of the storage capacitor Cst shown in FIGS. 5 and 7A proportionate to the area of the first storage electrode 124 is relatively greater than that of the storage capacitor Cst shown in FIGS. 1 and 2. In this case, if the capacitance of the storage capacitor Cst shown in FIGS. 5 and 7A has the same value as that of the storage capacitor Cst shown in FIGS. 1 and 2, then the area of overlapping the first and second storage electrodes 124 and 126 included in the storage capacitor Cst may be reduced, thereby improving an aperture ratio by the reduced area of overlapping the first and second storage electrodes 124 and 126.

Meanwhile, since disclination occurs within an area corresponding to the first conductive pattern 140 which receives a gate-off voltage Voff through the first storage electrode 124 connected with the gate line 102, light leakage of a left viewing angle may occur. For preventing the light leakage, the width of a black matrix (not shown), such as provided within the opposing color filter substrate, overlapping the first conductive pattern 140 should be increased. At this time, since the area of the black matrix is increased by the degree much smaller than the degree of the reduction of the area of overlapping the first and second storage electrodes 124 and 126, reduction of an aperture ratio by the black matrix is prevented.

Further, the second conductive pattern 150 facing the first conductive pattern 140 and formed in a floating structure includes the line portion 142 and the protrusion portion 144. The line portion 142 is overlapped by a left portion of the pixel electrode 122, and the protrusion portion 144 protrudes from the line portion 142 to be overlapped by the data line 104 of a previous or next stage adjacent to the left portion of the pixel electrode 122.

The line portion 142 is formed of the same metal and within a same layer of the TFT substrate as the gate line 102 on the lower substrate 101. The line portion 142 is overlapped by a left portion of the pixel electrode 122 with the gate insulating layer 112 and the protective layer 118 interposed there between to form the first parasitic capacitor Ca. In a repair process, a laser beam is irradiated onto a portion or portions A located at overlapping sections of the line portion 142 and the pixel electrode 122 of the defective pixel detected in a test process. For doing so, the line portion 142 is formed to have a line width greater than the diameter of the laser beam and is connected with the pixel electrode 122 of the defective pixel in the repair process.

The protrusion portion 144 is formed of the same metal and within a same layer of the TFT substrate as the line portion 142. The protrusion portion 144 is overlapped by the data line 104 of a previous or next stage adjacent to a left portion of the pixel electrode 122 with the gate insulating layer 112 and the protective layer 118 interposed there between to form the second parasitic capacitor Cb.

Figure 6:
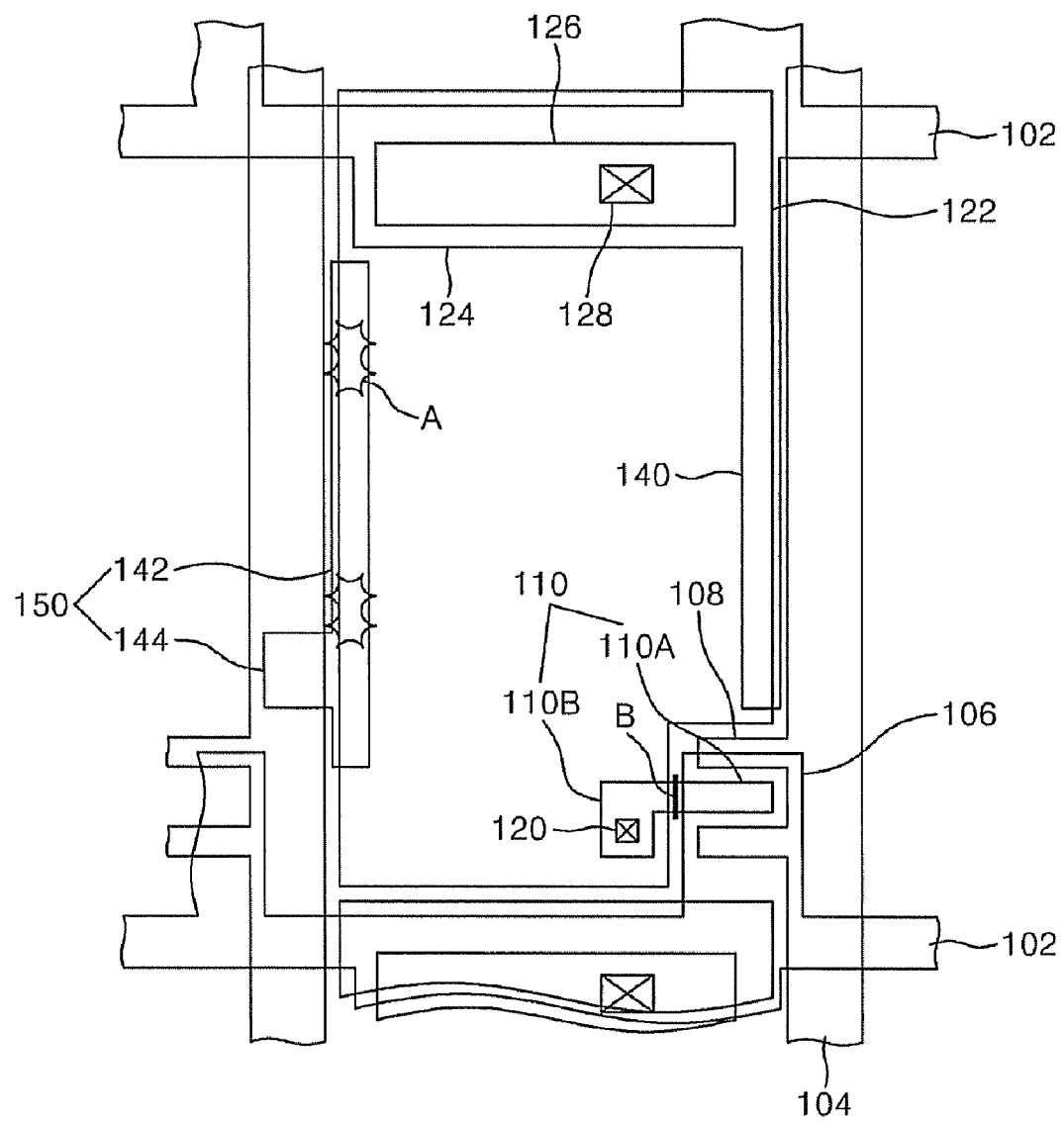
FIG. 6 is a plan view illustrating an exemplary method of repairing the exemplary LCD shown in FIG. 5.
Figure 7A:
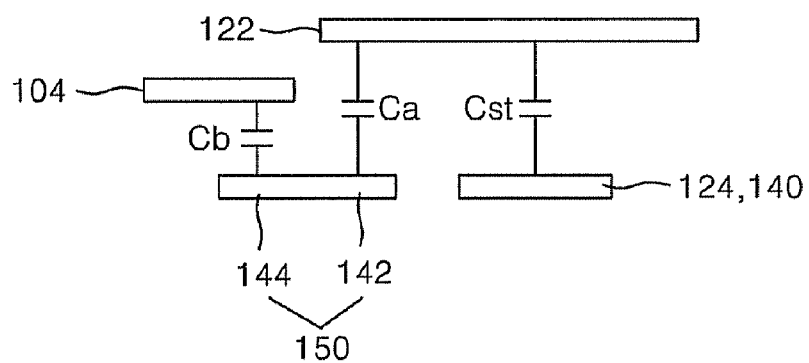
FIGS. 7A and 7B are graphical views comparing before and after repairing the exemplary TFT substrate of the exemplary LCD in accordance with the second exemplary embodiment of the present invention.
Figure 7B:
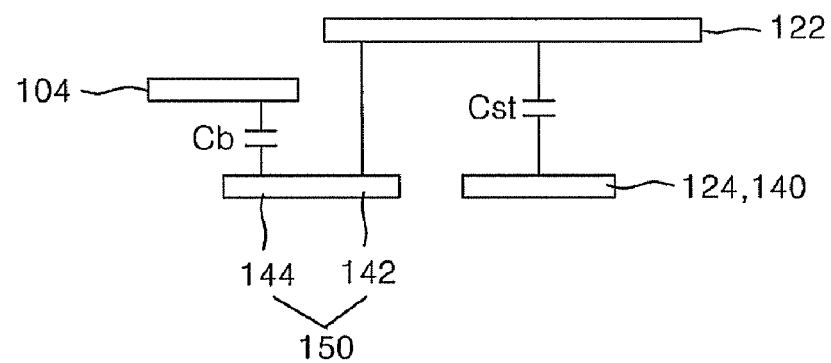

When the defective pixel is detected in a test process, a laser beam is irradiated onto portion or portions "A" located at overlapping sections of the pixel electrode 122 of the defective pixel and the line portion 142 of the second conductive pattern 150 as shown in FIG. 6, and thus the pixel electrode 122 and the line portion 142 of the second conductive pattern 150 are welded. Accordingly, the first parasitic capacitor Ca including the pixel electrode 122 and the line portion 142 of the second conductive pattern 150 shown in FIG. 7A becomes a short circuit, as shown in FIG. 7B. Then, the neck portion 110A and the head portion 110B of the drain electrode 110 of the TFT are separated by a cutting process, such as along cutting line B, and thus the TFT and the pixel electrode 122 are separated. Accordingly, the gate-off voltage Voff which is floated to the pixel electrode 122 by the storage capacitor Cst is discharged through the data line 104 of a previous or next stage connected with the protrusion portion 144 of the second conductive pattern 150 through the second parasitic capacitor Cb. As a result, the gate-off voltage Voff applied to the liquid crystal is gradually reduced, and thus a corresponding pixel is darkened to display a black color.

Figure 8:
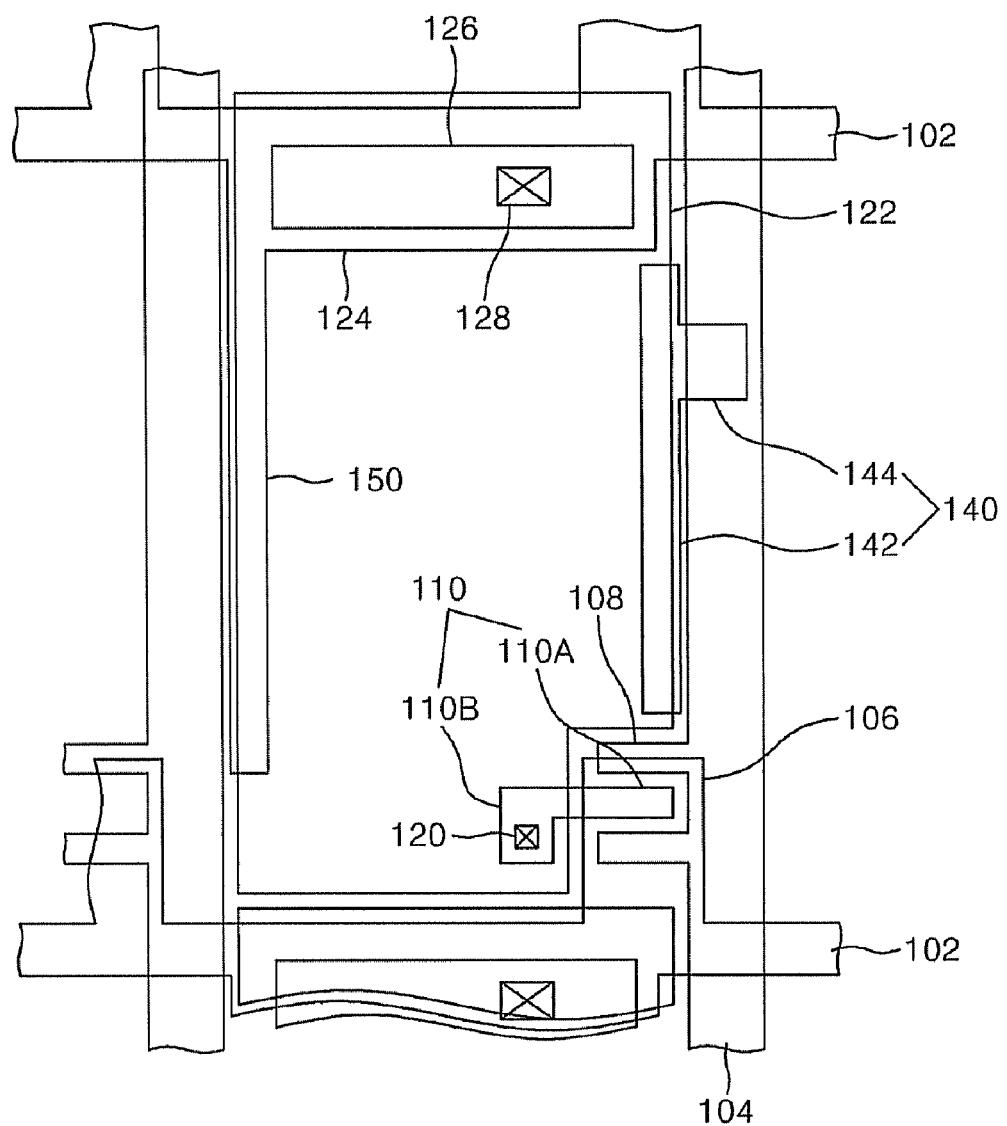
FIG. 8 is a plan view showing the exemplary TFT substrate of the exemplary LCD in accordance with a third exemplary embodiment of the present invention.

FIG. 8 is a plan view showing the exemplary TFT substrate in accordance with a third exemplary embodiment of the present invention.

In the exemplary TFT substrate shown in FIG. 8, a defective pixel becomes a dark spot through the first conductive pattern 140, which overlaps the data line of a current stage, compared to the exemplary TFT substrate shown in FIG. 5. The TFT substrate shown in FIG. 8 includes substantially the same configurations as that shown in FIG. 5 except that the second conductive pattern 150 is connected with the first storage electrode 124. Accordingly, the detailed description of same or similar elements will be omitted.

The storage capacitor Cst stably maintains the pixel voltage signal charged in the pixel electrode 122 until a next pixel signal is charged. The storage capacitor Cst is formed by overlapping the first storage electrode 124 connected with the gate line 102 of a previous stage and the second storage electrode 126, connected with the pixel electrode 122, with the gate insulating layer 112 interposed between the first and second storage electrodes 124 and 126.

The second storage electrode 126 is formed of the same metal as the data line 104 and within the same layer of the TFT substrate as the data line 104, and connected with the pixel electrode 122 via the second contact hole 128 penetrating the protective layer 118.

Figure 10A:
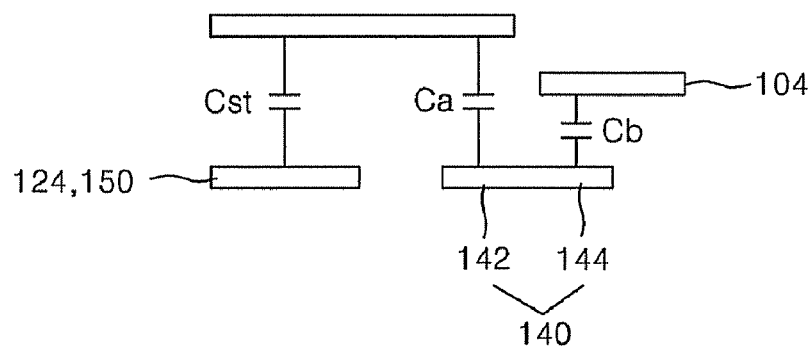
FIGS. 10A and 10B are graphical views comparing before and after repairing the exemplary TFT substrate of the exemplary LCD in accordance with the third exemplary embodiment of the present invention.

The first storage electrode 124 connects with the second conductive pattern 150 vertically extending from the first storage electrode 124. The second conductive pattern 150 is overlapped by a left portion of the pixel electrode 122, and is formed of the same metal as the gate line 102 and the first storage electrode 124 on the lower substrate 101. The area of the first storage electrode 124 connected with the second conductive pattern 150 becomes relatively wider than that of the first storage electrode 124 shown in FIGS. 1 and 2 by the second conductive pattern 150. Accordingly, the capacitance of the storage capacitor Cst shown in FIGS. 8 and 10A proportionate to the area of the first storage electrode 124 relatively increases compared to that of the storage capacitor Cst shown in FIGS. 1 and 2. In this case, if the capacitance of the storage capacitor Cst shown in FIGS. 8 and 10A is the same as that of the storage capacitor Cst shown in FIGS. 1 and 2, then the area of overlapping the first and second storage electrodes 124 and 126 included in the storage capacitor Cst may be reduced, thereby improving an aperture ratio by the reduced area of overlapping the first and second storage electrodes 124 and 126.

Meanwhile, since disclination occurs within an area corresponding to the second conductive pattern 150, which receives the gate-off voltage Voff through the first storage electrode 124 connected with the gate line 102, light leakage of a right viewing angle may occur. For preventing the light leakage, the width of a black matrix (not shown), such as within an opposing color filter substrate, overlapping the second conductive pattern 150 should be increased. At this time, the area of the black matrix is increased by the degree much smaller than the degree of reduction of the area of overlapping the first and second storage electrodes 124 and 126, thereby preventing reduction of an aperture ratio by the black matrix.

Further, the first conductive pattern 140 facing the second conductive pattern 150 and formed in a floating structure includes the line portion 142 and the protrusion portion 144. The line portion 142 is overlapped by a right portion of the pixel electrode 122, and the protrusion portion 144 protrudes from the line portion 142 to be overlapped by the data line 104 of a current stage adjacent to the right portion of the pixel electrode 122.

The line portion 142 is formed of the same metal and within the same layer of the TFT substrate as the gate line 102 on the lower substrate 101. The line portion 142 is overlapped by a right portion of the pixel electrode 122 with the gate insulating layer 112 and the protective layer 118 interposed there between to form the first parasitic capacitor Ca. In a repair process, a laser beam is irradiated onto a portion or portions A located at overlapping sections of the line portion 142 and the pixel electrode 122 of the defective pixel detected in a test process. For doing so, the line portion 142 is formed to have a line width greater than the diameter of the laser beam, and is connected with the pixel electrode 122 of the defective pixel in the repair process.

The protrusion portion 144 is formed of the same metal as the line portion 142 and within a same layer of the TFT substrate as the line portion 142. The protrusion portion 144 is overlapped by the data line 104 of a current stage adjacent to a right portion of the pixel electrode 122 with the gate insulating layer 112 and the protective layer 118 interposed there between to form the second parasitic capacitor Cb.

Figure 9:
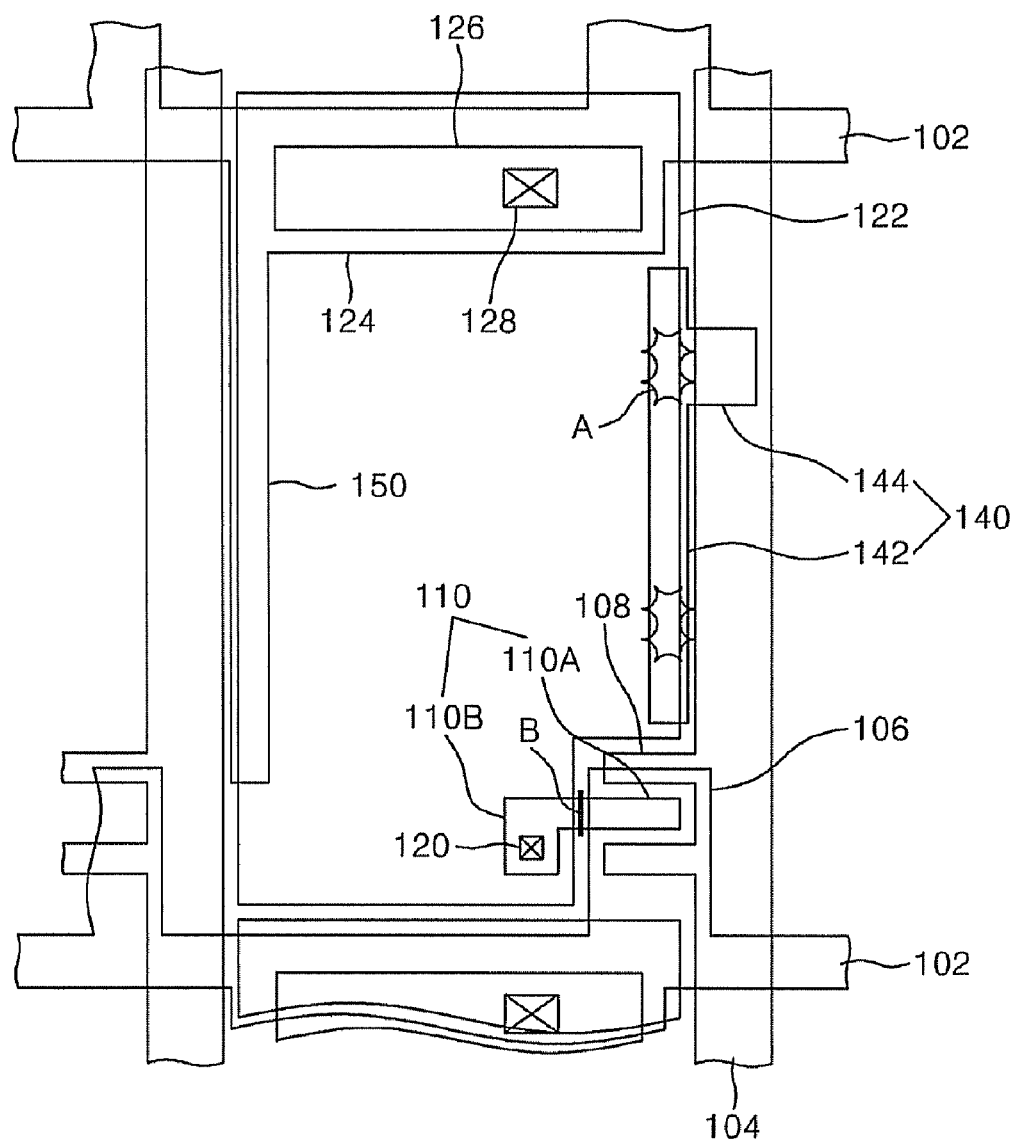
FIG. 9 is a plan view illustrating an exemplary method of repairing the exemplary LCD shown in FIG. 8.
Figure 10B:
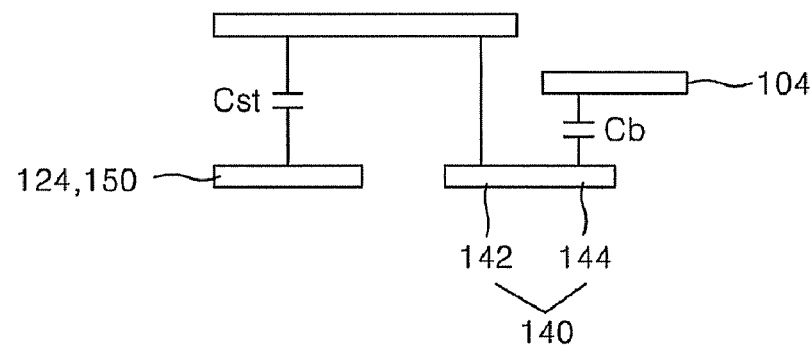

When the defective pixel is detected in a test process, a laser beam is irradiated onto a portion or portions "A" located at overlapping sections of the pixel electrode 122 of the defective pixel and the line portion 142 of the first conductive pattern 140, as shown in FIG. 9, and thus the pixel electrode 122 and the line portion 142 of the first conductive pattern 140 are welded. Accordingly, the first parasitic capacitor Ca including the pixel electrode 122 and the line portion 142 of the first conductive pattern 140 shown in FIG. 10A becomes a short circuit, as shown in FIG. 10B. Then, the neck portion 110A and the head portion 110B of the drain electrode 110 of the TFT are separated by a cutting process, such as along cutting line B) and thus the TFT and the pixel electrode 122 are separated. Accordingly, the gate-off voltage Voff, which is floated to the pixel electrode 122 by the storage capacitor Cst, is discharged through the data line 104 of a current stage connected with the protrusion portion 144 of the first conductive pattern 140 through the second parasitic capacitor Cb. As a result, the gate-off voltage Voff applied to the liquid crystal is gradually reduced, and thus a corresponding pixel is darkened to display a black color.

Meanwhile, in the TFT substrate shown in FIG. 1 including the first and second conductive patterns 140 and 150, the floated gate-off voltage Voff swings along data signals from the data line 104 of a current stage and the data line 104 of a previous or next stage through the second parasitic capacitor Cb, after a repair process. In this case, when the data signals of different polarities are supplied through the data line 104 of a current stage and the data line 104 of a previous or next stage, the data signals of the different polarities are cancelled, and thus a discharging effect of the gate-off voltage Voff through the data line 104 is reduced.

And, in the TFT substrate shown in FIG. 5 including the second conductive pattern 150, which is overlapped by the data line 104 of a previous or next stage, the floated gate-off voltage Voff swings along a data signal from the data line 104 of a previous or next stage through the second parasitic capacitor Cb, after a repair process. In this case, when the data signals of different polarities are supplied through the data line 104 of a current stage and the data line 104 of a previous or next stage, the gate-off voltage Voff floated to the pixel electrode 122 swings with a polarity opposite to that of the data line 104 of a current stage.

On the other hand, in the TFT substrate shown in FIG. 8 including the first conductive pattern 140, which is overlapped by the data line 104 of a current stage, the floated gate-off voltage Voff swings along a data signal from the data line 104 of a current stage through the second parasitic capacitor Cb, after a repair process. As a result, the TFT substrate shown in FIG. 8 has the data signal of a relatively low value influencing the gate-off voltage Voff floated to the pixel electrode 122 through the second parasitic capacitor Cb compared to the TFT substrates shown in FIGS. 1 and 5.

As described above, according to the LCD, a method of manufacturing the LCD, and a method of repairing the LCD in accordance with exemplary embodiments of the present invention, the gate-off voltage Voff floated to the pixel electrode by the storage capacitor is discharged through the data line connected with the protrusion portion of at least one of the first and second conductive patterns through the second parasitic capacitor. According to the LCD, a method of manufacturing the LCD, and a method of repairing the LCD in accordance with exemplary embodiments of the present invention, a repair may be implemented in a structure that has a polarizer for a wide viewing angle and a liquid crystal layer of a high dielectric constant.

Further, according to the LCD, a method of manufacturing the LCD, and a method of repairing the LCD in accordance with the present invention, one of the first and second conductive patterns is connected with the storage electrode, thereby increasing the capacitance of the storage capacitor. In this case, when the capacitance of the storage capacitor according to exemplary embodiments of the present invention is the same as that of a conventional storage capacitor, the area of the storage capacitor may be reduced and an aperture ratio may thus be improved by the degree of reduction of the area of the storage capacitor.

Although the exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A liquid crystal display comprising:
   a gate line formed on a substrate;
   a first data line intersecting the gate line with a gate insulating layer interposed there between;
   a thin film transistor connected with the gate line and the first data line;
   a pixel electrode connected with the thin film transistor;
   a first conductive pattern partially overlapping with a first end of the pixel electrode;

a second conductive pattern partially overlapping with a second end of the pixel electrode; and a storage capacitor comprising a first storage electrode connected with the gate line and a second storage electrode connected with the pixel electrode while interposing the gate insulating layer between the first and second storage electrodes, wherein at least one of the first conductive pattern and the second conductive pattern partially overlaps with the first data line adjacent to the first end of the pixel electrode and a second data line adjacent to the second end of the pixel electrode, respectively.

2. The liquid crystal display of claim 1, wherein the first conductive pattern and the second conductive pattern are formed of a same metal and within a same layer of the liquid crystal display as the gate line.

3. The liquid crystal display of claim 1, wherein the pixel electrode receives a pixel signal from the first data line adjacent to the first end of the pixel electrode.

4. The liquid crystal display of claim 3, wherein the first conductive pattern is connected with the first storage electrode and the second conductive pattern comprises a line portion overlapped with the second end of the pixel electrode and a protrusion portion overlapped with the second data line adjacent to the second end of the pixel electrode to form a floating state.

5. The liquid crystal display of claim 3, wherein the first conductive pattern comprises a line portion overlapped with the first end of the pixel electrode and a protrusion portion overlapped with the first data line adjacent to the first end of the pixel electrode to form a floating state, and the second conductive pattern is connected with the first storage electrode.

6. The liquid crystal display of claim 1, further comprising a polarizer for a wide viewing angle positioned over a back surface of the substrate.

7. The liquid crystal display of claim 1, further comprising a liquid crystal layer of a high dielectric constant driven by an electric field formed between the pixel electrode and a common electrode facing the pixel electrode.

8. A method of manufacturing a liquid crystal display, the method comprising:

forming on a substrate a gate metal pattern including a gate electrode, a gate line, a first storage electrode connected with the gate line, a first conductive pattern, and a second conductive pattern;

forming a gate insulating layer over the substrate on which the gate metal pattern is formed;

forming a semiconductor pattern including an active layer and an ohmic contact layer on the gate insulating layer;

forming a source/drain metal pattern including a source electrode, a drain electrode, and first and second data lines over the substrate on which the semiconductor pattern is formed;

forming a protective layer having a contact hole exposing the drain electrode over the substrate on which the source/drain metal pattern is formed; and forming on the protective layer a pixel electrode connected with the drain electrode, the pixel electrode having a first end partially overlapping the first conductive pattern and, a second end partially overlapping the second conductive pattern, wherein one of the first conductive pattern and the second conductive pattern partially overlaps the first data line adjacent to the first end of the pixel electrode and the second data line adjacent to the second end of the pixel electrode, respectively.

9. The method of claim 8, wherein one of the first conductive pattern and the second conductive pattern is connected with the first storage electrode.

10. The method of claim 9, wherein the first conductive pattern is connected with the first storage electrode, and the second conductive pattern comprises a line portion overlapped with the second end of the pixel electrode and a protrusion portion overlapped with the second data line adjacent to the second end of the pixel electrode to form a floating state.

11. The method of claim 9, wherein the first conductive pattern comprises a line portion partially overlapping with the first end of the pixel electrode and a protrusion portion overlapping with the first data line adjacent to the first end of the pixel electrode to form a floating state, and the second conductive pattern is connected with the first storage electrode.

12. The method of claim 8, further comprising, during forming the source/drain metal pattern, forming a second storage electrode which forms a storage capacitor by overlapping the first storage electrode with the gate insulating layer interposed there between, wherein the second storage electrode is connected with the pixel electrode.

13. The method of claim 8, further comprising a repairing process of electrically connecting at least one of the first conductive pattern and the second conductive pattern with the pixel electrode by a laser beam irradiated onto a portion of the at least one of the first conductive pattern and the second conductive pattern overlapped with the pixel electrode.

\* \* \* \* \*